United States Patent
Howie, Jr.

(10) Patent No.: US 7,874,777 B1
(45) Date of Patent: Jan. 25, 2011

(54) TAPERED SLEEVE, BOLT, NUT AND WASHER DEVICE

(75) Inventor: Robert K. Howie, Jr., Decatur, IL (US)

(73) Assignee: The Grigoleit Company, Decatur, IL (US)

( * ) Notice: Subject to any disclaimer, the term of this patent is extended or adjusted under 35 U.S.C. 154(b) by 386 days.

(21) Appl. No.: 12/173,095

(22) Filed: Jul. 15, 2008

Related U.S. Application Data

(60) Provisional application No. 60/949,992, filed on Jul. 16, 2007.

(51) Int. Cl.
 *F16B 5/02* (2006.01)
(52) U.S. Cl. .................... 411/368; 411/338; 403/408.1
(58) Field of Classification Search ............... 411/338, 411/339, 354, 367, 368, 546; 403/367, 370, 403/408.1
See application file for complete search history.

(56) References Cited

U.S. PATENT DOCUMENTS

| | | | |
|---|---|---|---|
| 2,519,927 A | | 8/1950 | Pedu, Jr. |
| 3,270,410 A | * | 9/1966 | Salter et al. .................... 29/446 |
| 3,322,449 A | * | 5/1967 | Becker ....................... 403/388 |
| 3,596,943 A | | 8/1971 | Krauss |
| 3,835,615 A | * | 9/1974 | King, Jr. ................... 403/408.1 |
| 3,847,495 A | | 11/1974 | Peter et al. |
| 3,849,015 A | | 11/1974 | Peter et al. |
| 3,921,364 A | * | 11/1975 | Briles ......................... 411/378 |
| 3,962,843 A | * | 6/1976 | King, Jr. ..................... 403/243 |
| 4,192,621 A | * | 3/1980 | Barth .......................... 403/15 |
| 4,244,661 A | * | 1/1981 | Dervy ....................... 403/243 |
| 4,268,185 A | | 5/1981 | Mullenberg |
| 4,326,826 A | * | 4/1982 | Bunyan ...................... 411/339 |
| 4,396,310 A | | 8/1983 | Mullenberg |
| 4,850,771 A | * | 7/1989 | Hurd ........................... 411/43 |
| 7,207,741 B2 | | 4/2007 | Gorski et al. |

\* cited by examiner

*Primary Examiner*—Flemming Saether
(74) *Attorney, Agent, or Firm*—Cook Alex Ltd.

(57) ABSTRACT

An attachment device for joining planar metal members to one another. A tapered passage is formed through the metal members. A tapered metal sleeve is positioned in the tapered passage. An elongated headed fastener is inserted through the sleeve. A bearing washer is positioned between the headed portion of the fastener and the metal members with the bearing washer engaging the tapered sleeve. A spacer washer is positioned between the bearing washer and the metal members to limit movement of the bearing washer against the tapered sleeve. A nut threads onto the threaded end of the fastener. A spacer washer is positioned between the nut and the smaller diameter end of the tapered sleeve to prevent the nut from engaging the smaller diameter and of the tapered sleeve when the nut is threaded on the headed fastener.

4 Claims, 2 Drawing Sheets

TAPERED SLEEVE, BOLT, NUT AND WASHER DEVICE

This application claims the benefit of U.S. Provisional Patent Application Ser. No. 60/949,992, filed Jul. 16, 2007, and is incorporated herein by reference.

BACKGROUND AND SUMMARY OF THE INVENTION

This invention is an easily assembled and easily removed attachment device for attaching two or more members having generally simple or compound planar interfacing surfaces. The invention relates to maximizing the translation of forces between two or more attached members and the use of an attachment device whereby two or more members are attached together, such as steel members and/or aluminum members, by the attachment device. The invention is particularly useful when the attached members are constantly subject to reversal of loads such as members of an airplane wing which are subject to intermittent gust loads. The "Tapered Sleeve, Bolt, Nut and Washer Device" design is best suited for purposes of maximizing stress or force translation in that the design allows for the pre-loading of both tension and shear forces that are expected to occur between two or more attached members including those forces that are expected to continually reverse. A tapered member within a matching tapered hole and separate axial forcing member have long been used for aligning and clamping, either externally or internally, another separate axially located piece(s). For example, a lathe's or milling machine's tapered, split collet and draw bar assembly is often used to clamp and hold a work piece(s). In another example, a pair of tapered washers are oppositely inserted into tapered holes in pairs of spaced apart parallel members. An axially aligned bolt is inserted through all washers and parallel members and tightened as appropriate to provide an aligned, but an axially rotatable connection, between one of the set of parallel members and the other set of parallel members. This arrangement has been used to attach airplane wings to other parts of an airplane.

The "Tapered Sleeve, Bolt, Nut and Washer Device" (hereinafter "TSD") has multiple purposes and allows for a freely rotatable bolt and nut to force both a single aligning tapered sleeve into a similarly tapered hole through parallel members while utilizing a surrounding washer arrangement to securely clamp the now aligned parallel members from further movement.

One purpose of my invention is to establish intimate contact forces that are approximately perpendicular to the interfacing surfaces of the attached members and the various planar TSD surfaces, i.e., those surfaces that are perpendicular to the axis of the utilized TSD and that are engaging the spacer washer, so as to take appropriate advantage of friction and other mechanical forces to transfer through all of the planar interfaces a portion of the expected loads.

A second purpose of the TSD is to establish contact forces that are approximately parallel to the interfacing surfaces of the attached members, i.e., those surfaces that are approximately parallel to the axis of the TSD and that are engaging the conical outer surface of the tapered sleeve, so as to take appropriate advantage of the ability of the tapered sleeve to transfer through itself the various expected shear loads from each attached member to the other.

A third purpose is to independently control those forces acting on those surfaces that are perpendicular to the axis of the utilized TSD and that are engaging the spacer washers and those forces that are acting on those surfaces that are approximately parallel to the axis of the TSD and that are engaging the conical outer surface of the tapered sleeve.

A fourth purpose is to fowl the tapered sleeve of adequate strength to resist assembly and/or working forces to the extent that such forces cannot cause the tapered sleeve to distort to the extent that the tapered sleeve interferes with any bolt threads (if the bolt mid-shaft is not smooth, but is threaded) which could cause damage to the tapered sleeve interior wall, nor cause the tapered sleeve to distort to the extent that it clamps on or restrains the bolt from being able to easily be removed and to easily be replaced and reassembled with the same or different washer stack up and from the same or opposite end of the hole of the tapered sleeve.

A fifth purpose is to allow the TSD and one or more of the attached members to be easily disassembled and then later to be reassembled. This type of easy disassembly and reassembly is extremely beneficial in a situation where inspections are done for various purposes.

A sixth purpose is to accomplish all of the above five purposes using commonly available hardware, i.e., one bolt, one nut and a few but multiple washers, and the minimum quantity of special hardware, i.e., one tapered sleeve.

A seventh purpose is to apply a choke ring of compression forces, for example, by using the compression forces of the spacer washers against the metal members when the bolt and nut is tightened, for counter-acting the outward exertion of tension forces applied on the attached members tapered hole surfaces when the tapered sleeve is tightly inserted into a tapered hole. The compression forces can be applied by using either commonly available hardware or using a specially shaped spacer washer in contact with the attached members all to reduce the possibility of stress cracking of the attached members in the tapered surface around the tapered sleeve.

The TSD of the invention maximizes surface area contact with the members that are being attached together in order to maximize the translation of forces or load-shift function of the attachment device itself. Typically, a bolt, tapered pin, or rivet is or are used as a common attachment device. The individual use of such a common attachment device does not efficiently utilize the maximum available surface area whereby the common attachment device could make contact with the attached members' surfaces and, thereby, the use of those common attachment devices individually or in combination does not efficiently maximize the force translation or load-shift function of the attachment device and attached members. In contrast, the TSD design efficiently and effectively utilizes and maximizes the horizontal and vertical, or x-axis and y-axis, surface contact area, and, thus, as an attachment device, the invention efficiently maximizes the translation of forces from one attached member to another and maximizes the corresponding load-shift function where such a force translation/load-shift design is utilized or implemented.

In the TSD design described herein, the tapered sleeve is used to shift or translate a lateral force or a load from one surface directly and laterally into another while minimizing lateral shift. The members that are attached together are typically metal. For illustrative purposes, it is easier to discuss only two attached members. Attached member 1 is subject to a lateral force and attached member 2 serves the purpose of receiving the load from member 1 to member 2 via an attachment device that translates such load from 1 to 2. In this depiction, holes in the attached members 1 and 2 are reamed out from member 1 through member 2 with the appropriately sized tapered reamer. The reamed holes, larger in member 1 and smaller in member 2, then receive the matched tapered sleeve. The tapered sleeve is forced tightly into and partially through these reamed tapered holes by the tightening of a nut threaded on the bolt that is placed through the axial hole in the center of the tapered sleeve with such nut bearing on a bearing washer that is placed around the threaded shank of the bolt with such bearing washer further bearing on a spacer washer of which a series of spacer washers is placed around the tapered sleeve as necessary until the stack up of spacer washers is raised just beyond the smaller diameter end portion of the tapered sleeve so there is no contact with the smaller end portion of the tapered sleeve with the head of such bolt being supported on a bearing washer supported on spacer washers located around the larger end of such tapered sleeve that is protruding from the member 1 side of the thereby attached 1 and 2 members with such bearing washer bearing on the large end of the tapered sleeve. The nut and bolt assembly can be reversed as may be appropriate to the particular application. The number of spacer washers that are appropriate to compensate for the minor dimensional differences in the tapered sleeve and the tapered holes in 1 and 2 are placed around each of the large and the small diameter ends of the tapered sleeve to control the depth of insertion of the tapered sleeve into the tapered holes that traverse through members 1 and 2. In this manner, the tapered, near vertical, surface of the hole in attached member 1 fits tightly against the tapered sleeve, while the tapered sleeve further fits tightly against the tapered, near vertical, surface of the hole in attached member 2 allowing for the translation of lateral forces from member 1 through the tapered sleeve to member 2 with the axial component of such force translation being appropriately compensated for through the spacer and bearing washers and the bolt and nut. Unlike with a tapered pin design which, through axial forces, can loosen with the reversal of lateral forces, the tapered sleeve is loosely or tightly contained within the parallel members depending on the stack-up of the parallel members and the washer system and by the entrapment of the tapered sleeve around the bolt. The localized, intimate mating of the parallel surfaces of the members 1 and 2 effected by the axial force of the tightened bolt and nut acting on the spacer washers provides a means to translate lateral forces from attached member 1 to member 2 through friction forces and other mechanical means.

The use of the bolt, nut and washer(s) of the TSD controls the insertion, engagement, and removal of the tapered sleeve. The tapered sleeve is not hammered into the tapered holes as is common with a tapered pin, nor is it pulled into the tapered holes by a bolt threaded onto the small end of the tapered pin as is also common. The tapered sleeve is pushed into the reamed holes by the controlled force of tightening the bolt, but the depth of insertion is controlled by using the spacer washer(s) as a spacer, while also dependent on the angle of the tapered hole and the diameters of the tapered sleeve and tapered hole. For example, if a common 0.031 inch thick washer is used as a spacer to control the depth of insertion and there is a 5 degree taper on the sleeve, then it is known that removing the 0.031 inch thick washer and further tightening the nut and bolt will allow an additional interference of 0.0027 inches per side of surrounding material or a total of 0.0054 inches additional interference across the diameter of the tapered hole. Different thicknesses or engagement portions of washers will produce different but similarly predictable results. In this manner, the insertion does not uncontrollably disturb the material of members 1 and 2, instead, the insertion is controlled. Any minimum and maximum axial force to be exerted on the tapered sleeve will vary with the application. There are two different types of washers used to control the insertion of the tapered sleeve on members 1 and 2 via the tightening of the bolt. The bearing washers bear directly under the bolt head and nut and can land directly on the end faces of the tapered sleeve. The bearing washers are a loose fit on the bolt shank, as they are designed specific to be used with a specific shank diameter. This fit provides the best mechanical interaction between the bearing washer and the shank. The spacer washer or washers fit just over the large end outside diameter of the tapered sleeve and can be stacked-up beyond the end face of the tapered sleeve. In other words, the bearing washer or washers can be made to bear or land on the face of the tapered sleeve by adjusting the height of the stack-up of the spacer washers to expose the end face of the tapered sleeve or the bearing washer can bear on the face of a spacer washer if the spacer washers are stacked higher than the end face of the tapered sleeve. The stack-up of the spacer washers depends on the desired depth of insertion of the tapered sleeve. The number of bearing washers depends on the length of the bolt shank. In addition, in determining the bolt to use it is necessary to be sure that the bolt shaft is long enough for the intended stack-up and that the thread length is such that it accommodates the tightening of the nut. The longer thread length accommodates the tightening of the bolt for removal purposes, but the bearing washers can be stacked up for this purpose if the thread length does not extend up the shaft far enough for the tightening and removal purpose.

The lower, i.e., small end face of the tapered sleeve has spacer washers stacked-up so that the lower bearing washer does not rest on the tapered sleeve small end face. This is because the tightening of the bolt and the insertion and tight containment of the tapered sleeve needs to be independent of an upward force on the lower small end face of the tapered sleeve. Once the bolt is tightened as desired, the tapered sleeve is engaged or trapped in place. The tapered sleeve can be removed by removing the spacer washers from around the lower end face of the tapered sleeve and adding bearing washers around the bolt shank and then tightening the nut further which will push-up on the tapered sleeve via contact with the tapered sleeve lower end face and cause it to be gently removed upward.

The TSD allows for independently controlled compression between the metal members 1 and 2. The ability to control the insertion depth of the tapered sleeve, in turn, allows for the control over the amount of compression between the two metal members.

The tapered sleeve application must be conducive to commercial tolerances. The nature of the application is that the manufacture of standard sizes of the tapered sleeve is preferable to allow the tapered sleeve design application to work with varying attached members and their varying thicknesses. In this regard, there is no exact measurement for how far the tapered sleeve will extend above or below the attached members.

The force translation can be discussed for illustrative purposes by using a two-dimensional x-axis (horizontal) and y-axis (vertical) synopsis. The metal members 1 and 2 are situated along the x-axis. The tapered sleeve insertion along the y-axis itself provides a slight downward force on the lower member to create a 'vertical' mating of the surfaces of members 1 and 2. When the tapered sleeve is forced/fitted into the reamed holes and the bolt is tightened to tightly mate the metal members, the horizontal forces can translate from the horizontal axis of the members (laying at a 0° angle) into the 'vertically' mated tapered sleeve (note: the tapered sleeve is not situated along the Y-axis at a perfect vertical 90°, but its exterior wall is actually angled, as it is tapered, for example it may be at a 5° angle from the Y-axis) (FIG. 1). The tight fit between the metal members and the tapered sleeve allows for maximum force translation along those mated surfaces. In addition, the friction created along the horizontal surfaces of the tightly mated surfaces of the metal members allows forces to translate vertically along those surfaces. In summary, the tapered sleeve can translate a horizontal/lateral force in metal member 1, along the vertical wall of the tapered sleeve, and into the horizontal axis of another metal member, 2, thereby translating forces from one metal member into another attached member, and the tight mating of the members along the surface of their horizontal axes allows for the translation of forces through friction and mechanical means associated with minor surface irregularities, both planned for and unplanned for, between the horizontal surfaces of the two attached members 1 and 2.

The tapered sleeve is such that the interior walls of the tapered sleeve are vertical, at a 90° angle, creating a tube or cylinder through the tapered sleeve. The cylindrical hole in the tapered sleeve receives the cylindrical shaft of an appropriately correlating size of bolt. The bolt is tightened via its nut. There is space between the interior tapered sleeve wall and the bolt shaft. Under certain conditions of use when it is expected that the tapered sleeve itself will not be able to support the working loads perpendicular to its axis without unacceptable distortion, it will be desirable to design to maintain the clearance between the inner diameter of the tapered sleeve and the outer diameter of the bolt at the minimum dimension necessary to assure ease of assembly and disassembly while at the same time allowing the smooth surface of the bolt shank to provide offsetting support to the inner surface of the tapered sleeve so that any distortion in the tapered sleeve that is expected due to the working loads can be translated or shifted through such bolt shank to the opposing sleeve surface. In this situation, a partially threaded, smooth shank bolt is preferable to a fully threaded bolt.

The "Tapered Sleeve, Bolt and Washer Device" design invention and proposed patent presents several 'objects and advantages' and, additionally, incorporates advances to the presently available attachment members.

a) Controlled insertion of tapered sleeve.

b) Removal of tapered sleeve with ease and without damaging metal members.

Containment of the tapered sleeve so that it will not loosen with vibration or force reversal.

d) Independently controlled compression of parallel attached metal members.

DESCRIPTION OF THE PREFERRED EMBODIMENT

Figure 1:
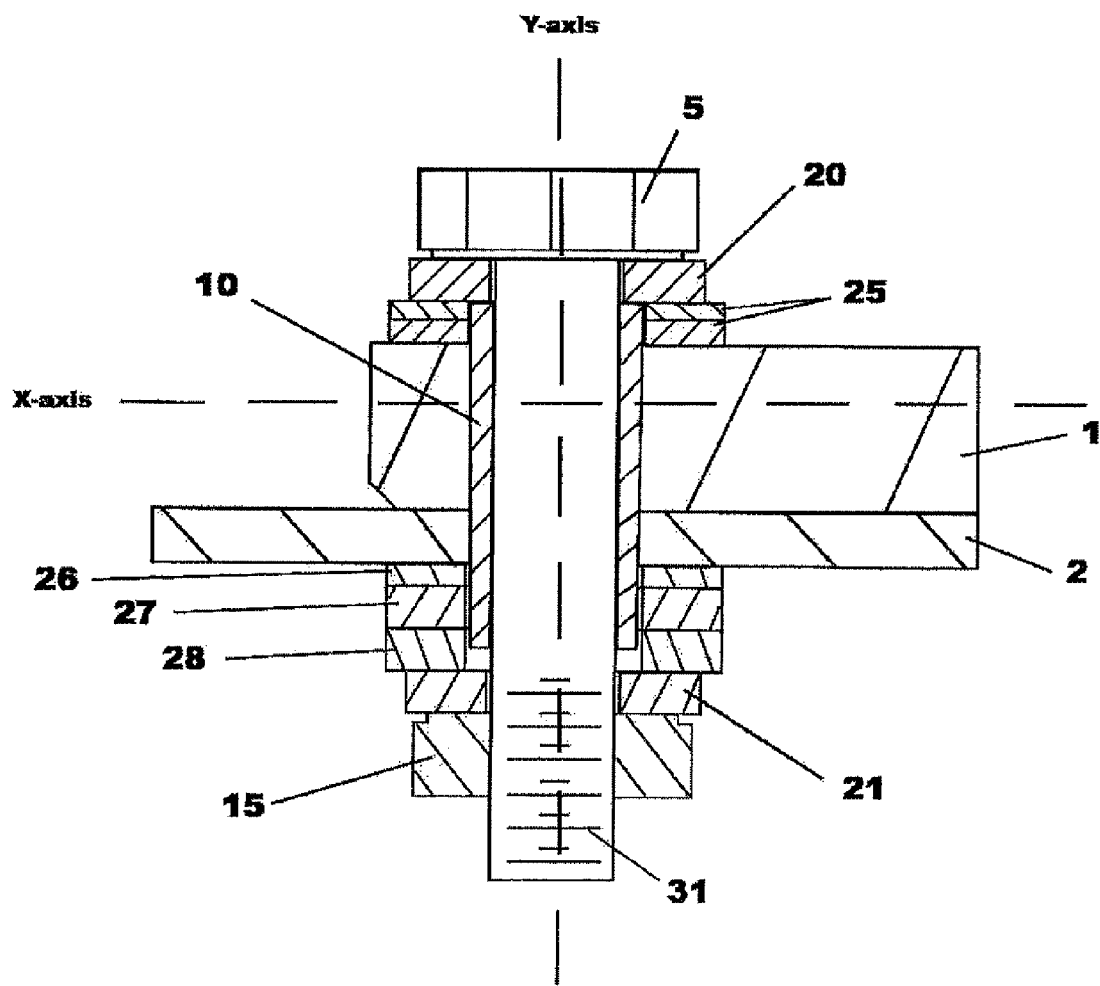
FIG. 1 is a partial cross-sectional view of the attachment device of this disclosure shown attaching two planar metal members.
Figure 2:
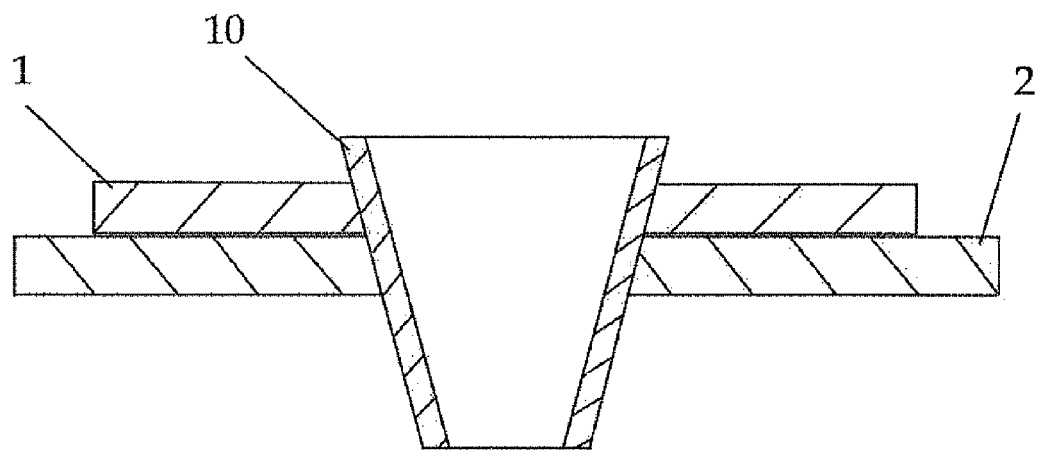
FIG. 2 is a cross-sectional view of the tapered sleeve of the invention installed in the tapered passage through the planar members with the tapers of the passage and the sleeve greatly exaggerated for purposes of illustration.

In FIG. 1, a tapered sleeve 2 is shown installed in a tapered passage extending through metal planar members 1 and 2. This arrangement of the tapered sleeve and metal planar members is also shown in FIG. 2, but in FIG. 2 the taper of the passage and the taper of the sleeve are exaggerated for purposes of illustration. The angle of the tapered passage and the angle of the outer surface of the tapered sleeve are approximately the same, at least as close to each other as commercial tolerances permit. Preferably, the angle should be about five degrees but this angle is only suggestion and is not mandatory.

The length of the tapered sleeve 10 is dependent upon the total thickness of the planar members to be attached. Whether only two members 1 and 2 as shown in the drawings, are being attached or more than two members are being attached, the length of the tapered sleeve selected should be such that it exceeds and extends beyond the remote or outer surfaces of both of the planar members. When both the larger and smaller diameter ends of the tapered sleeve extend beyond the remote or outer surfaces of the planar members 1 and 2 as shown in the drawings, there will be sufficient space to install one or more bearing washers 20 between the head of the fastener 5, which is inserted through the tapered sleeve 10, and the larger diameter outer end of the tapered sleeve thereby permitting tightening of the headed fastener 5 to controllably force the tapered sleeve into the tapered passage. Also, because the smaller diameter end of the tapered sleeve extends beyond the remote surface of the planar member 2, a nut which attaches to threads 31 formed at the end of the headed fastener 5 may be used to engage the smaller end of the tapered sleeve to remove it from the tapered passage in the event it becomes necessary to do so.

In normal use, the nut 15 is attached to the threads 31 of the fastener 5 after the spacer washers 26, 27 and 28 have been positioned over the smaller end of the tapered sleeve and the end of the headed fastener. The number and thicknesses of the spacer washers 26, 27 and 28 are selected so that the outermost spacer washer extends outwardly beyond the smaller diameter end of the tapered sleeve. With this arrangement, when the nut 15 is tightened on the threads 31 of the headed fastener 5, it forces the bearing washer 21 against the outermost spacer washer 28 which prevents the nut from acting on the smaller diameter end of the tapered sleeve. Instead, tightening of the nut 15 on the threads 31 forces the head of the headed fastener 5 through its bearing washer 20 to engage the larger diameter end of the tapered sleeve thereby forcing the tapered sleeve into the tapered passage with the depth of insertion of the tapered sleeve into the tapered passage limited by engagement of the bearing washer 20 with the outer most of the spacer washers 25.

As can be seen in FIG. 1, threads 31 are formed at the nut 15 receiving end of the headed fastener 5. While most of the headed fastener shaft may be threaded, as is conventional, it is preferred that the threads be formed only near the nut receiving end of the headed fastener so that the threads will not extend into the interior of the tapered sleeve 10 to prevent the tapered sleeve from being forced against the threads and possibly interfering with removal of the threaded fastener from the sleeve. This does not mean that a headed fastener such as a bolt with threads along a major portion of its length cannot be used in the practice of this invention, but if such a bolt is used clearance should be maintained between the threads of the fastener and the interior wall of the tapered sleeve.

The invention claimed is:

1. An attachment device for joining at least two elongated planar metal members having adjacent planar surfaces in contact with each other and their remote planar surfaces facing away from each other, said attachment device comprising:

a tapered passage having a pre-selected taper extending through said metal planar members from one of said remote planar surfaces to the other of said remote planar surfaces, an elongated tapered metal sleeve having an external taper corresponding to said taper of said tapered passage with said tapered metal sleeve positioned in said tapered passage with the larger and smaller diameter ends of said tapered sleeve located beyond said remote planar surfaces of said metal members, an elongated headed fastener extending through said tapered metal sleeve, said fastener having a threaded portion located at its end opposite to said headed portion with said headed portion positioned adjacent said larger diameter end of said tapered sleeve and said threaded portion positioned adjacent said smaller diameter portion of said tapered metal sleeve, a bearing washer located between said headed portion of said fastener and said remote planar surface of planar member with said bearing washer engaging said tapered sleeve, a spacer washer surrounding said tapered sleeve and positioned between said bearing washer and said remote planar surface of said planar metal member to limit movement of said bearing washer against said tapered sleeve, a nut fitted on said threaded portion of said headed fastener, and a spacer washer located between said nut and said smaller diameter end of said tapered sleeve to prevent said nut from engaging said smaller diameter end of said tapered sleeve when said nut is fitted on said threaded portion of said headed fastener.

2. The attachment device of claim 1 in which at least a pair of spacer washers are positioned between said bearing washer and said remote planar surface of said planar metal member.

3. The attachment device of claim 1 in which said spacer washer located between said nut and such smaller diameter end of said tapered sleeve is removable to permit said nut to allow said nut to engage said smaller diameter end of said tapered sleeve to assist in removal of said tapered sleeve from said tapered passage.

4. The attachment device of claim 1 in which a bearing washer is positioned on said threaded portion of said headed fastener to engage said spacer washer and said nut to prevent said nut from engaging said smaller diameter end of said tapered sleeve.

* * * * *